US012597092B2

(12) United States Patent
Morita et al.

(10) Patent No.:   US 12,597,092 B2
(45) Date of Patent:       Apr. 7, 2026

(54) SYSTEMS AND METHODS FOR ALTERING IMAGES

(71) Applicant: FUJIFILM HEALTHCARE AMERICAS CORPORATION, Lexington, MA (US)

(72) Inventors: Keiichi Morita, Cary, NC (US); Jeffrey Minnich, Milton, GA (US); Jeanmarie Rogers, Portsmouth, RI (US)

(73) Assignee: FUJIFILM HEALTHCARE AMERICAS CORPORATION, Lexington, MA (US)

( * ) Notice: Subject to any disclaimer, the term of this patent is extended or adjusted under 35 U.S.C. 154(b) by 344 days.

(21) Appl. No.: 17/962,886

(22) Filed:       Oct. 10, 2022

(65) Prior Publication Data

US 2024/0119564 A1      Apr. 11, 2024

(51) Int. Cl.
*G06V 10/60*       (2022.01)
*G06T 5/40*         (2006.01)
(Continued)

(52) U.S. Cl.
CPC ................. *G06T 5/40* (2013.01); *G06T 7/60* (2013.01); *G06T 7/70* (2017.01); *G06T 11/00* (2013.01); *G06V 10/60* (2022.01)

(58) Field of Classification Search
CPC .... G06T 5/40; G06T 7/60; G06T 7/70; G06T 11/00; G06T 7/11; G06T 7/136; G06T 2207/10081; G06T 2207/10088; G06T 2207/10116; G06T 2207/20212; G06T 2207/30052; G06T 2207/30068;
(Continued)

(56) References Cited

U.S. PATENT DOCUMENTS 8,160,346 B2     4/2012  Gatesoupe et al.
8,983,159 B2     3/2015  Tomisaki et al.
(Continued)

OTHER PUBLICATIONS

Vedantham, Srinivasan et al. "Semi-automated Segmentation and Classification of Digital Breast Tomosynthesis Reconstructed Images", Dec. 1, 2011, ieee embs 2011, pp. 6188-6191. Retrieved from IEEE Xplore: <URL: https://ieeexplore.ieee.org/document/6091528>. <DOI: 10.1109/IEMBS.2011.6091528>. (Year: 2011).*

*Primary Examiner* — Matthew C Bella
*Assistant Examiner* — Nicholas John Helco
(74) *Attorney, Agent, or Firm* — Baker Botts L.L.P.

(57)                ABSTRACT

Method for altering pixel brightness values in a digital image includes identifying a measured brightness value of each of the plurality of pixels; determining a location of the plurality of pixels corresponding to an artificial object in the digital image based on the measured brightness value of each of the plurality of pixels; and adjusting the measured brightness value of each of the pixels at the location of the plurality of pixels corresponding to the artificial object in the digital image to a predetermined brightness value. Method for altering pixel tone values in a digital image includes calculating a tone conversion configured to suppress a tone of the artificial object in the digital image; applying the tone conversion to each of the pixels at the location of the plurality of pixels corresponding to the artificial object in the digital image.

8 Claims, 14 Drawing Sheets

1JA                    1JB

(51) Int. Cl.
    *G06T 7/60*           (2017.01)
    *G06T 7/70*           (2017.01)
    *G06T 11/00*         (2026.01)

(58) Field of Classification Search
    CPC ......... G06T 5/94; G06T 7/0012; G06T 7/187;
              G06T 11/008; G06T 2207/10096; G06T
              2207/10004; G06T 2207/30004; G06T
              2210/41; G06V 10/60; G06V 10/50;
              G06V 2201/03; G06V 10/507
    See application file for complete search history.

(56)                References Cited

U.S. PATENT DOCUMENTS

| | | | |
|---|---|---|---|
| 2007/0002276 A1* | 1/2007 | Hirohara | A61B 3/0025 |
| | | | 351/221 |
| 2008/0002872 A1* | 1/2008 | Gatesoupe | A61B 6/5252 |
| | | | 382/132 |
| 2011/0103663 A1* | 5/2011 | Rosenbaum | G06T 7/11 |
| | | | 382/131 |
| 2011/0317898 A1* | 12/2011 | Shi | G06T 7/30 |
| | | | 382/131 |
| 2015/0288933 A1* | 10/2015 | Iversen | G06T 7/174 |
| | | | 348/14.07 |
| 2017/0079530 A1* | 3/2017 | DiMaio | A61B 5/0261 |
| 2017/0103519 A1* | 4/2017 | Zlotnick | G06T 7/194 |
| 2018/0259608 A1* | 9/2018 | Golden | G01R 33/5608 |
| 2020/0342597 A1* | 10/2020 | Chukka | G06T 7/194 |
| 2025/0285226 A1* | 9/2025 | Morita | G06T 11/00 |

* cited by examiner

402

1JC

402

1JB

402

1JA

410

1JF

410

1JG

SYSTEMS AND METHODS FOR ALTERING IMAGES

BACKGROUND

1. Field of Disclosed Subject Matter

The disclosed subject matter is directed to systems and methods for altering the brightness of pixels in images, for example, medical images, and more specifically, Digital Imaging and Communications in Medicine ("DICOM") Objects. The systems and methods described herein can adjust the brightness of pixels in a digital image and using tone conversion logic to suppress brighter pixels.

2. Description of Related Art

In medical imaging, Picture Archiving and Communication Systems ("PACS") are a combination of computers and networks dedicated to the storage, retrieval, presentation, and distribution of images. While medical information can be stored in a variety of formats, a common format of image storage is DICOM. DICOM is a standard in which, among other things, medical images and associated meta-data can be communicated from imaging modalities (e.g., x-ray (or x-rays' digital counterparts: computed radiography ("CR") and digital radiography ("DR")), computed tomography ("CT"), and magnetic resonance imaging ("MRI") apparatuses) to remote storage and/or client devices for viewing and/or other use.

When viewing medical images stored in DICOM format, it can be important for a user to accurately read and identify individual pixel values to properly read the image. However, the human eye can be heavily influenced by the brightness of background pixels. Further, a large contrast between brighter and darker pixels can lead to strain on the user's eyes. Accordingly, it can be beneficial to adjust the brightness values of individual pixels in the medical images.

Typically, the large contrast between brighter and darker images occurs when the medical images contain an artificial object, for example, a breast implant. The implant can be significantly brighter than the surrounding tissue, which can lead a radiologist examining the medical image to be influenced by the brightness of the implant when they are trying to examine the surrounding tissue.

Accordingly, there is a need for systems and methods for altering the brightness of pixels in images.

SUMMARY

The purposes and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as the appended figures.

To achieve these and other advantages and in accordance with the purpose of the disclosed subject matter, as embodied and broadly described the disclosed subject matter is directed to systems and methods for altering the brightness of pixels in images. For example, a method of altering pixel brightness values in a digital image, the method includes receiving, at one or more computing devices, a digital image, the digital image having a plurality of pixels; identifying, at the one or more computing devices, a measured brightness value of each of the plurality of pixels; determining, at the one or more computing devices, a location of the plurality of pixels corresponding to an artificial object in the digital image based on the measured brightness value of each of the plurality of pixels; and adjusting, at the one or more computing devices, the measured brightness value of each of the pixels at the location of the plurality of pixels corresponding to the artificial object in the digital image to a predetermined brightness value to form a new digital image.

The predetermined brightness value can be less than the measured brightness value. Determining, at the one or more computing devices, the location of the plurality of pixels corresponding to the artificial object in the digital image based on the brightness value of each of the plurality of pixels can include assigning each of the plurality pixels one of: a first value if the measured brightness value of each of the plurality of pixels is above a threshold value, and a second value if the measured brightness value of each of the plurality of pixels is below the threshold value. The threshold value can be any value between 75% and 95% of a maximum brightness value of the digital image.

The location of the plurality of pixels corresponding to the artificial object in the digital image can be based on if the plurality of pixels are assigned the first value. The method can also include displaying, at one or more computing devices, the new digital image.

In accordance with the disclosed subject matter, a system including one or more processors; and a memory coupled to the processors comprising instructions executable by the processors are provided. The processors can be operable when executing the instructions to: receive a digital image, the digital image having a plurality of pixels; identify a measured brightness value of each of the plurality of pixels; determine a location of the plurality of pixels corresponding to an artificial object in the digital image based on the measured brightness value of each of the plurality of pixels; and adjust the measured brightness value of each of the pixels at the location of the plurality of pixels corresponding to the artificial object in the digital image to a predetermined brightness value to form a new digital image.

In accordance with the disclosed subject matter, a method of altering pixel tone values in a digital image is provided. The method including receiving, at one or more computing devices, a digital image, the digital image having a plurality of pixels; identifying, at the one or more computing devices, a measured brightness value of each of the plurality of pixels; determining, at the one or more computing devices, a location of the plurality of pixels corresponding to an artificial object in the digital image based on the measured brightness value of each of the plurality of pixels; calculating, at the one or more computing devices, a tone conversion configured to suppress a tone of the artificial object in the digital image. The tone conversion includes measuring, at the one or more computing devices, at least one pixel tone value of the digital image; analyzing, at the one or more computing devices, the at least one pixel tone value of the digital image to calculate a target pixel tone value based on the location of the plurality of pixels corresponding to the artificial object in the digital image; and adjusting, at the one more computing devices, the at least one pixel tone value of the digital image to the target pixel tone value. The method also includes applying, at the one or more computing devices, the tone conversion to each of the pixels at the location of the plurality of pixels corresponding to the artificial object in the digital image to form a new digital image.

The at least one pixel tone value can be at least one of a maximum pixel tone value, a minimum pixel tone value, an image histogram. When the at least one pixel tone value is the image histogram, the tone conversion can also include determining an artificial object histogram based on the location of the plurality of pixels corresponding to the artificial object in the digital image. The artificial object histogram can have a first window width and the image histogram can have a second window width, where the first window width can have a first window center and the second window width can have a second window center. The calculating of the target pixel tone value can include at least one of adjusting the first window width to be substantially the same as the second window width and adjusting the first window center to be substantially the same second window center.

In accordance with the disclosed subject matter, a system including one or more processors; and a memory coupled to the processors comprising instructions executable by the processors are provided. The processors can be operable when executing the instructions to: receive a digital image, the digital image having a plurality of pixels; identify a measured brightness value of each of the plurality of pixels; determine a location of the plurality of pixels corresponding to an artificial object in the digital image based on the measured brightness value of each of the plurality of pixels; calculate a tone conversion configured to suppress a tone of the artificial object in the digital image. The tone conversion can include instructions to: measure an image histogram of the digital image; analyze the image histogram to determine an artificial object image histogram based on the location of the plurality of pixels corresponding to the artificial object in the digital image; and adjust the artificial object image histogram to form a target image histogram. The processors can also be operable when executing the instructions to apply the tone conversion to the location of the plurality of pixels corresponding to the artificial object in the digital image to form a new digital image.

DRAWINGS

DETAILED DESCRIPTION

Figure 1:
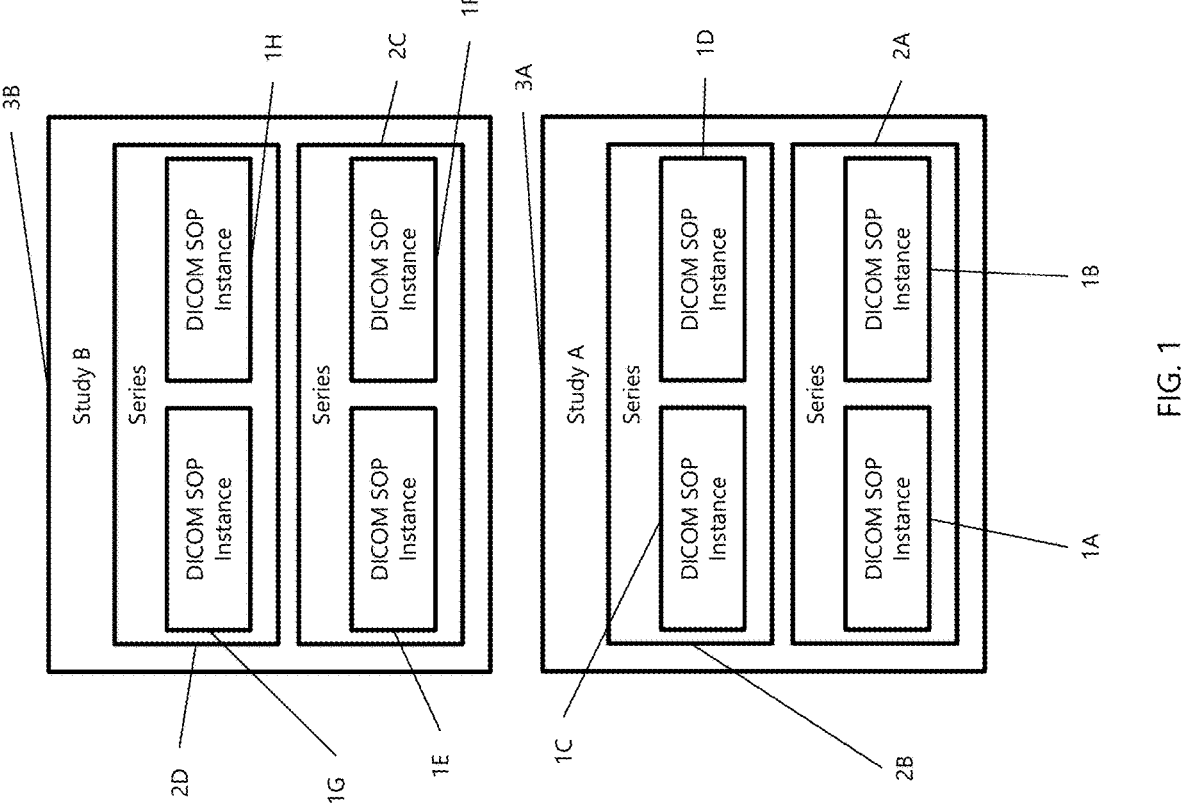
FIG. 1 shows a hierarchy of medical image records that can be altered in accordance with the disclosed subject matter.
Figure 2:
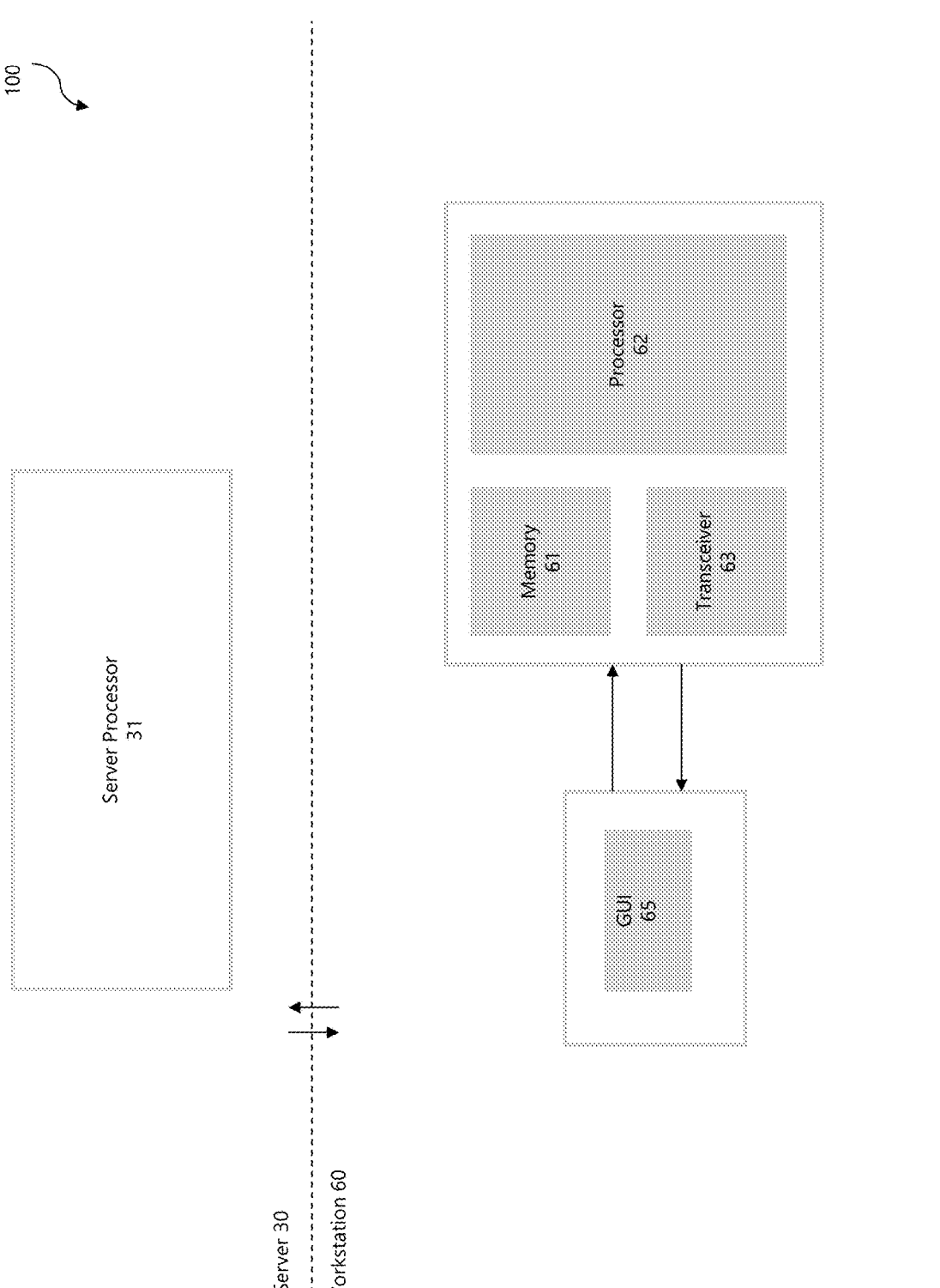
FIG. 2 shows the architecture of a system for altering the brightness of pixels in digital images by masking, in accordance with the disclosed subject matter.

Reference will now be made in detail to various exemplary embodiments of the disclosed subject matter, exemplary embodiments of which are illustrated in the accompanying drawings. For purpose of illustration and not limitation, the systems and method are described herein with respect to altering the brightness of pixels in digital images, and particularly, digital medical images (also referred to as "medical image"), specifically DICOM images. However, the methods and systems described herein can be used for altering the brightness of pixels in any digital image. As used in the description and the appended claims, the singular forms, such as "a," "an," "the," and singular nouns, are intended to include the plural forms as well, unless the context clearly indicates otherwise. Accordingly, as used herein, the term medical image can refer to one medical image, or a plurality of medical images. For example, and with reference to FIG. 1 for purpose of illustration and not limitation, as referred to herein a medical image record can include a single DICOM Service-Object Pair ("SOP") Instance (also referred to as "DICOM Instance" "DICOM image" and "image") 1 (e.g., 1A-1H), one or more DICOM SOP Instances 1 in one or more Series 2 (e.g., 2A-D), one or more Series 2 inside one or more Studies 3 (e.g., 3A, 3B), and one or more Studies 3. The DICOM image can have a photometric interpretation tag associated with the image. The photometric interpretation tag can identify, for example, that the image can be interpreted under Monochrome1, Monochrome 2, RGB, YBR_Full, etc. The DICOM image can have a window center attribute. The DICOM image can have a window width attribute.

Referring to FIGS. 2-5 for purpose of illustration and not limitation, the disclosed system 100 can be configured to alter pixel brightness values in a digital image. For example, system 100 can be configured to alter pixel brightness values in a medical image record, such as DICOM images (e.g., 1J). Particularly, System 100 can alter the brightness values of the DICOM Images 1 (e.g., 1J) such that the DICOM Images 1 (e.g., 1J) are easier to read, for example, for making medical diagnoses. The system 100 can include one or more computing devices defining a server 30 and user workstation 60. The user workstation 60 can be coupled to the server 30 by a network. The network, for example, can be a Local Area Network ("LAN"), a Wireless LAN ("WLAN"), a virtual private network ("VPN"), or any other network that allows for any radio frequency or wireless type connection. For example, other radio frequency or wireless connections can include, but are not limited to, one or more network access technologies, such as Global System for Mobile communication ("GSM"), Universal Mobile Telecommunications System ("UMTS"), General Packet Radio Services ("GPRS"), Enhanced Data GSM Environment ("EDGE"), Third Generation Partnership Project ("3GPP") Technology, including Long Term Evolution ("LTE"), LTE-Advanced, 3G technology, Internet of Things ("IOT"), fifth generation ("5G"), or new radio ("NR") technology. Other examples can include Wideband Code Division Multiple Access ("WCDMA"), Bluetooth, IEEE 802.11b/g/n, or any other 802.11 protocol, or any other wired or wireless connection.

Workstation 60 can take the form of any known client device. For example, workstation 60 can be a computer, such as a laptop or desktop computer, a personal data or digital assistant ("PDA"), or any other user equipment or tablet, such as a mobile device or mobile portable media player. Server 30 can be a service point which provides processing, database, and communication facilities. For example, the server 30 can include dedicated rack-mounted servers, desktop computers, laptop computers, set top boxes, integrated devices combining various features, such as two or more features of the foregoing devices, or the like. Server 30 can vary widely in configuration or capabilities, but can include one or more processors, memory, and/or transceivers. Server 30 can also include one or more mass storage devices, one or more power supplies, one or more wired or wireless network interfaces, one or more input/output interfaces, and/or one or more operating systems.

A user can be any person authorized to access workstation 60 and/or server 30, including a health professional, medical technician, researcher, or patient. In some embodiments a user authorized to use the workstation 60 and/or communicate with the server 30 can have a username and/or password that can be used to login or access workstation 60 and/or server 30.

Workstation 60 can include GUI 65, memory 61, processor 62, and transceiver 63. Medical image records 10 received by workstation 60 can be processed using one or more processors 62. Processor 62 can be any hardware or software used to execute computer program instructions. These computer program instructions can be provided to a processor of a general purpose computer to alter its function to a special purpose, a special purpose computer, application-specific integrated circuit ("ASIC"), or other programmable digital data processing apparatus, such that the instructions, which execute via the processor of the workstation 60 or other programmable data processing apparatus, implement the functions/acts specified in the block diagrams or operational block or blocks, thereby transforming their functionality in accordance with embodiments herein. The processor 62 can be a portable embedded micro-controller or micro-computer. For example, processor 62 can be embodied by any computational or data processing device, such as a central processing unit ("CPU"), digital signal processor ("DSP"), ASIC, programmable logic devices ("PLDs"), field programmable gate arrays ("FPGAs"), digitally enhanced circuits, or comparable device or a combination thereof. The processor 62 can be implemented as a single controller, or a plurality of controllers or processors.

Workstation 60 can send and receive medical image records 10 from server 30 using transceiver 63. Transceiver 63 can, independently, be a transmitter, a receiver, or both a transmitter and a receiver, or a unit or device that can be configured both for transmission and reception. In other words, transceiver 63 can include any hardware or software that allows workstation 60 to communicate with server 30. Transceiver 63 can be either a wired or a wireless transceiver. When wireless, the transceiver 63 can be implemented as a remote radio head which is not located in the device itself, but in a mast. While FIG. 2 only illustrates a single transceiver 63, workstation 60 can include one or more transceivers 63. Memory 61 can be a non-volatile storage medium or any other suitable storage device, such as a non-transitory computer-readable medium or storage medium. For example, memory 61 can be a random-access memory ("RAM"), read-only memory ("ROM"), hard disk drive ("HDD"), erasable programmable read-only memory ("EPROM"), electrically erasable programmable read-only memory ("EEPROM"), flash memory or other solid-state memory technology. Memory 61 can also be a compact disc read-only optical memory ("CD-ROM"), digital versatile disc ("DVD"), any other optical storage, magnetic cassettes, magnetic tape, magnetic disk storage or other magnetic storage devices, or any other physical or material medium which can be used to tangibly store the desired information or data or instructions and which can be accessed by a computer or processor. Memory 61 can be either removable or non-removable.

Figure 3:
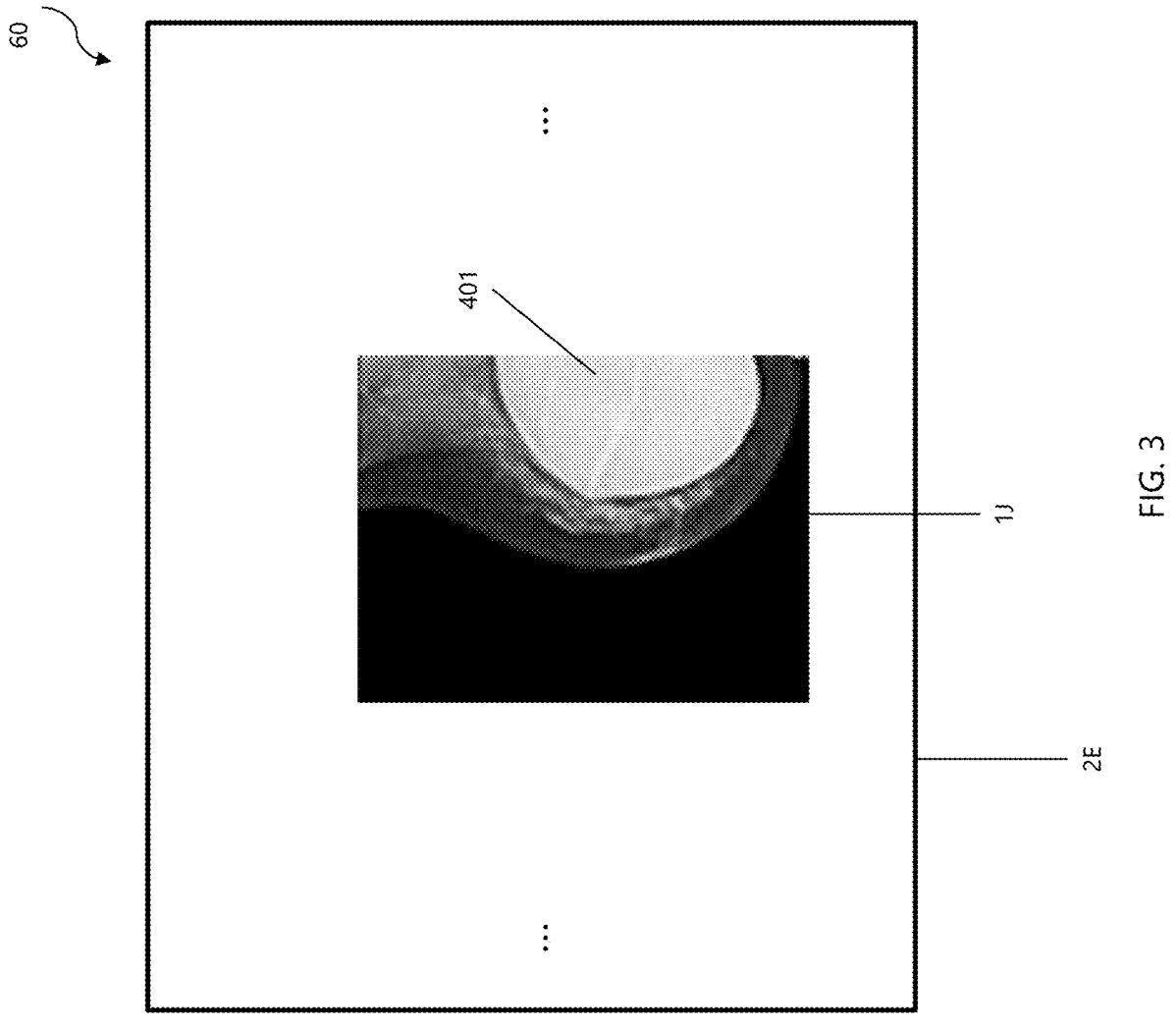
FIG. 3 shows a medical image that contains an artificial object, in accordance with the disclosed subject matter.

As shown in FIG. 3, for purpose of illustration and not limitation, medical image record 10 can be a DICOM image (e.g., 1J). FIG. 3 only shows one DICOM image 1J for purpose of clarity. The DICOM image can be, for example, can be a Digital Mammography X-Ray Image, or other 2-D medical image. The DICOM can also be, for example, a Breast Tomosynthesis Image, or other 3-D medical image.

In operation, and with reference to FIGS. 2-5 for purpose of illustration and not limitation, system 100 can be used to alter the pixel brightness values of medical image record 10. Medical image record 10 can be received by workstation 60 and instructions can be provided to workstation 60 to alter the pixel brightness values of medical image record 10, and particularly, each DICOM image 1 (e.g., 1J). The instructions can come from the server processor 31 on server 30. The instructions can also be provided by a local processor in workstation 60, or the instructions can be provided by both the server processor 31 on server 30 and the local processor in workstation 60. The process is described below with reference to DICOM image 1J, however, the process can be performed for a plurality of DICOM images 1 (e.g., 1J). Alternatively, or additionally, the process can be performed for one or a plurality of digital images of any suitable format.

Workstation 60 can identify the pixel brightness value of a plurality of pixels in the DICOM image 1J through measurement of each pixel's brightness in the plurality of pixels in the DICOM image 1J. The DICOM image 1J can have a max pixel brightness value. Each pixel of the plurality of pixels in DICOM image 1J has an initial brightness value. The initial brightness value can be represented by an 8 bit gray scale value, such as an 8 bit monochrome1 value or an 8 bitmonochrome2 value. The measurement of the pixel brightness value can be performed using different techniques known in the art. For example, DICOM images can have a pixel value for each of the plurality of pixels in the image, a window center and a window width of the pixel values in the DICOM image. From the window center and the window width, the slope and intercept can be calculated by the following formulas:

$$slope = \frac{Max\ Pixel\ Brightness\ Value}{Window\ Width} \qquad (1)$$

$$intercept = -slope * window\ center + \frac{Max\ Pixel\ Brightness\ Value}{2} \qquad (2)$$

Where the Max Pixel Brightness Value can be, for example, 255. The slope, intercept and pixel value can be used to obtain the 8 bit gray scale value by the following formula:

$$8\ bit\ gray\ scale\ value = pixel\ value * slope + intercept \qquad (3)$$

If the photometric interpretation tag of the DICOM image is, for example, Monochrome1, the 8 bit gray scale value is assigned as the 8 bit monochrome1 value. The 8 bit monochrome 2 value is calculated by the following formula:

$$\begin{aligned}8\ bit\ monochrome2\ value = Max\ Pixel\ Brightness\\ Value - 8\ bit\ monochrome1\ value\end{aligned} \qquad (4)$$

The 8 bit monochrome2 value can be assigned as the initial brightness value.

Workstation 60 can determine a location of the plurality of pixels in DICOM image 1J that corresponds to an artificial object region 401 located in a patient's body. The artificial object region 401 in DICOM image 1J can be located using different techniques. For example, the artificial object region 402 can be located using a binarization technique and an extraction technique, as shown in FIGS. 4A and 4B respectively.

Figure 4C:
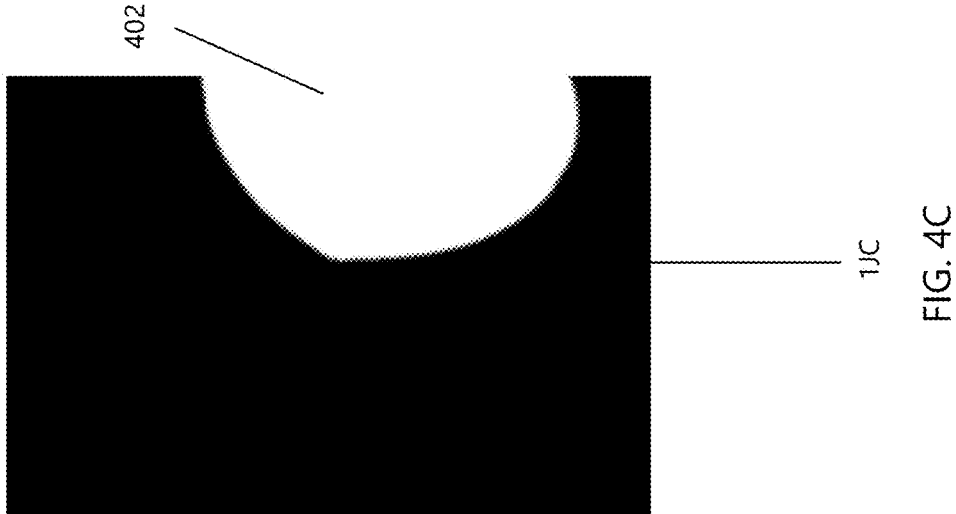
FIG. 4C shows an altered image of the extracted image of FIG. 4B, in accordance with the disclosed subject matter.
Figure 4B:
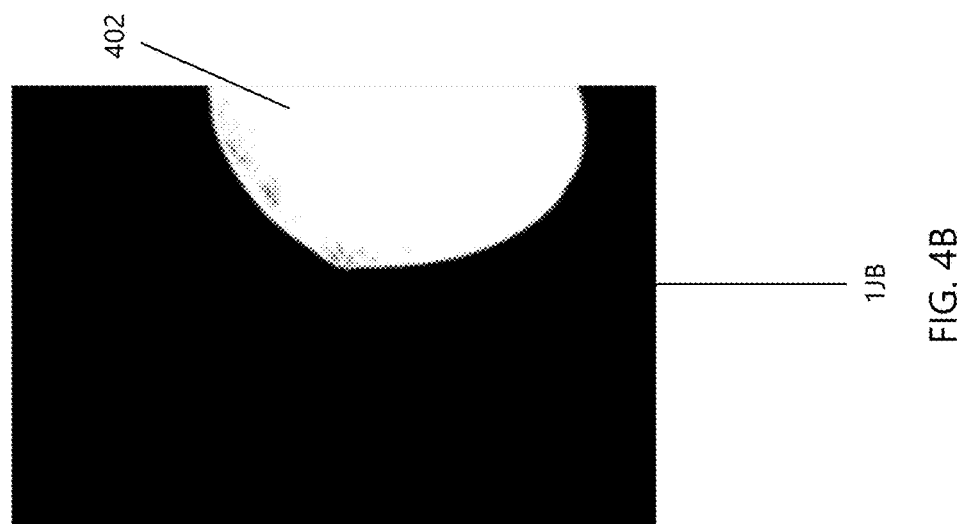
FIG. 4B shows an extracted image where the largest object is extracted from the binarized digital image of FIG. 4A.
Figure 4A:
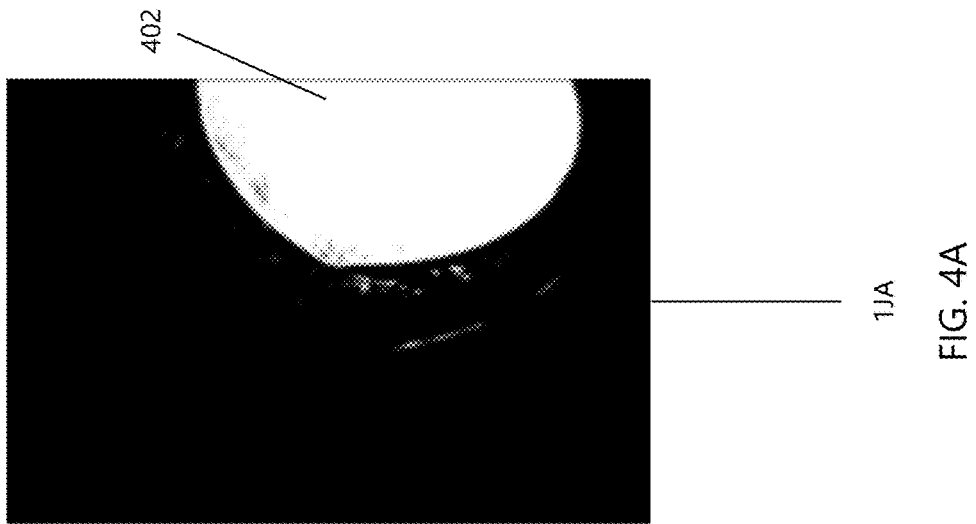
FIG. 4A shows a binarized digital image of the medical image of FIG. 3.

The binarization technique, as shown in FIG. 4A, can include taking DICOM image 1J and changing the pixel brightness values of the plurality of pixels in the DICOM image 1J to either a first brightness value or a second brightness value. For example, the plurality of pixels in the DICOM image 1J can be changed to be either bright, i.e. the first brightness value, or dark, i.e. the second brightness value. The first brightness value can be a value of 1. The second brightness value can be a value of 0. Each pixel of the plurality of pixels in the DICOM image 1J can be determined as bright or dark based on the measured brightness value. The binarization technique can include setting a threshold brightness value, or a binarization reference value. For each pixel of the plurality of pixels, if the measured brightness value of each pixel is greater than the binarization reference value, the binarization technique can change each pixel to the first brightness value. For each pixel of the plurality of pixels, if the measured brightness value of each pixel is less than the binarization reference value, the binarization technique can change each pixel to the second brightness value. For example, the binarization technique can be applied to all of the pixels in the DICOM image 1J, such that each pixel in the DICOM image 1J is either a bright pixel or a dark pixel creating a binarized image 1JA, as shown in FIG. 4A. The binarization reference value can be set at 95% of the max pixel brightness value. Other suitable binarization reference values can also be used, for example, and without limitation 90%, 85%, and 80% of the max pixel brightness value. The binarization reference value can be between 75% and 95% of the maximum brightness value.

The extraction technique, as shown in FIG. 4B, can include taking the binarized image 1JA, as shown in FIG. 4A, and labeling the binarized image 1JA to identify the largest object region 402. The labeling of the binarized image 1JA can be performed according to methods well known in the art for labeling pixels in an image. For example, the binarized image 1JA can be labeled using the process known as connected-component labeling to create a labeled image where each of the pixels in the image is labeled. Using the labeled image, the largest object region 402 can be identified by checking the total number of pixels for each of the labels in the labeled image for the label with the greatest number of pixels and assigning that label as the largest object region 402. The largest object region 402 has a plurality of pixels that can be labeled as a plurality of pixels corresponding to the largest object region 402. The extraction technique can include retaining a location of the plurality of pixels corresponding to the largest object region 402. The extraction technique can also include extracting the largest object region 402 from the binarized image 1JA into a new extracted image 1JB, as shown in FIG. 4B. The extracted image 1JB can include the plurality of pixels corresponding to the largest object region 402. The extracted image 1JB can include the location of the plurality of pixels corresponding to the largest object region 402. The plurality of pixels corresponding to the largest object region 402 can have either the first brightness value, or the second brightness value.

The extraction technique, as shown in FIG. 4C, can include taking the extracted image 1JB and setting the pixel brightness values of each of the plurality of pixels corresponding to the largest object region 402 to the first brightness value, representing bright pixel, creating altered extracted image 1JC, where all of the plurality of pixels in the largest object region 402 have the first brightness value and each of the plurality of pixels in the largest object region 402 can be labeled as the plurality of pixels corresponding to the artificial object region 401 in DICOM image 1J. The location of the plurality of pixels corresponding to the largest object region 402 can be assigned as a location of the plurality of pixels corresponding to the artificial object region 401 in DICOM image 1J. Accordingly, each of the plurality of pixels corresponding to the artificial object region 401, as shown in FIG. 4C, can have the first brightness value.

Figure 5:
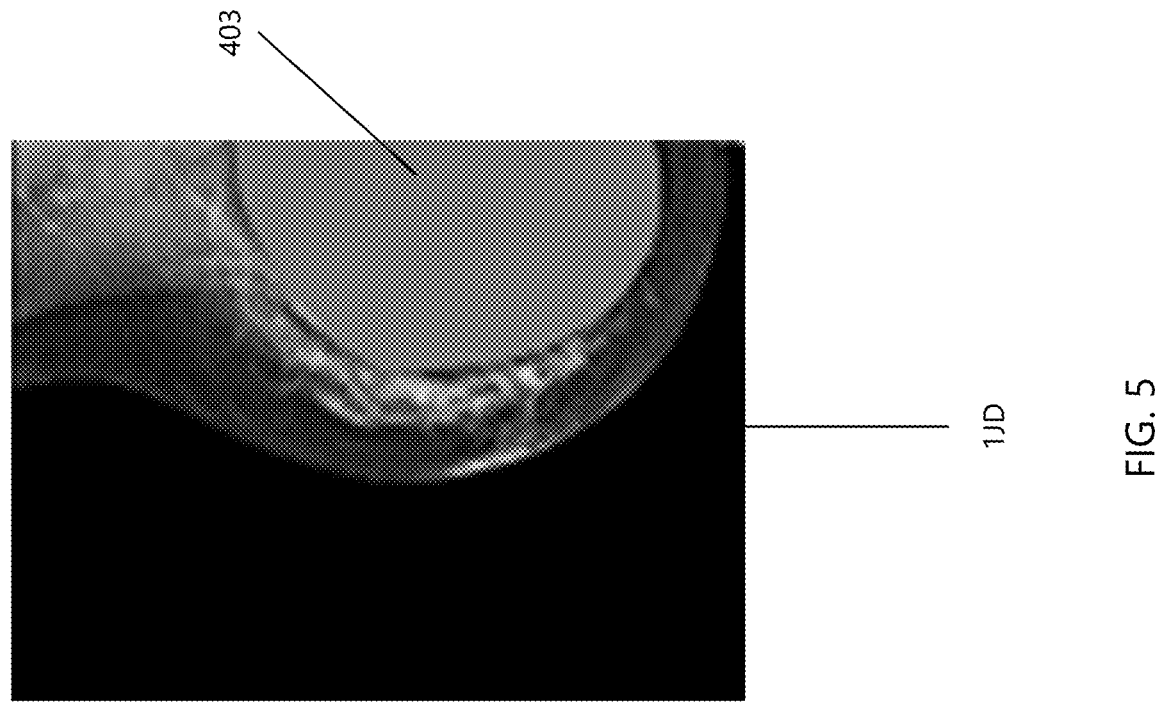
FIG. 5 shows an altered medical image of the medical image of FIG. 3.

Workstation 60 can adjust the pixel brightness values of the artificial object region 401 in DICOM image 1J to a predetermined brightness value to generate an altered DICOM image 1JD, as shown in FIG. 5. Workstation 60 can alter the pixel brightness values in the location of the artificial object region 401 in DICOM image 1J to create an altered artificial object region 403 in DICOM image 1J. The predetermined brightness value can be assigned as a gray pixel having a pixel brightness value of 128. The predetermined brightness value can be assigned as a dark pixel having a pixel brightness value of 0. Altered artificial object region 403 can have a pixel brightness value that is less than a brightest measured pixel value in the artificial object region. For example, altered artificial object region 403 can have a pixel brightness value set to the predetermined brightness value. For example, and as shown in FIG. 5, the altered artificial object region 403 can have a dimmed pixel brightness value. In accordance with the disclosed subject matter, the altered artificial objection region 403 can have a pixel brightness value of 0. Accordingly, the altered artificial objection region 403 can be masked such that it creates an altered DICOM image 1JD, as shown in FIG. 5.

Figure 6:
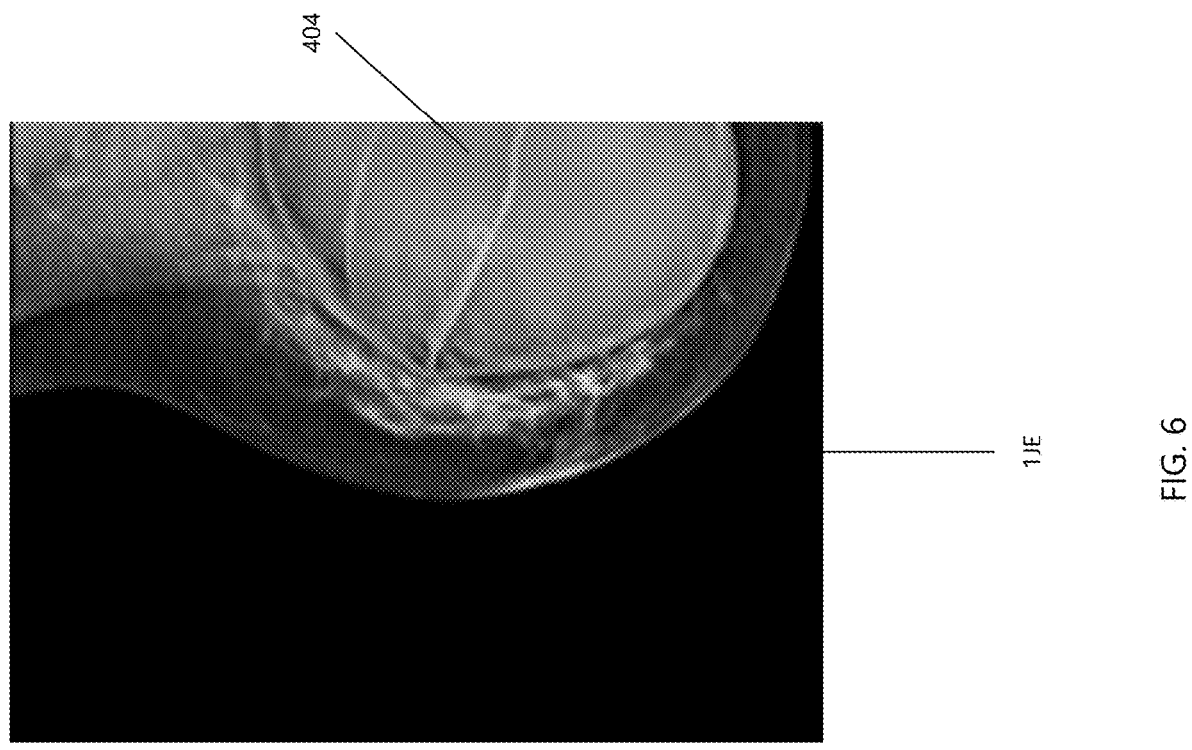
FIG. 6 shows an altered medical image by tone suppression, in accordance with the disclosed subject matter.

Workstation 60 can alter a pixel tone value in the DICOM image 1J to create a tone suppressed DICOM image 1JE, as shown in FIG. 6. The tone suppressed DICOM image 6J can alter the pixel tone value using different techniques. For example, a tone suppression technique, or tone conversion, can be used, as shown in FIG. 6. The tone conversion can include measuring at least one pixel tone value of the DICOM image 1J. In accordance with the disclosed subject matter, the at least one pixel tone value can include an image

Figure 7B:
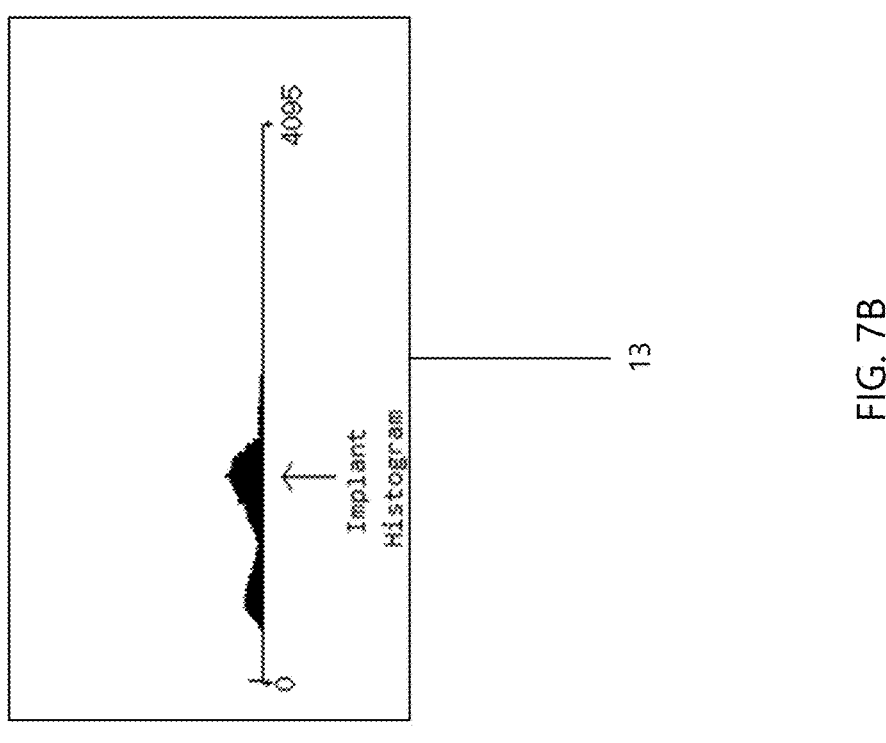
FIGS. 7A and 7B show an image histogram before and after tone suppression, respectively, in accordance with the disclosed subject matter.
Figure 7A:
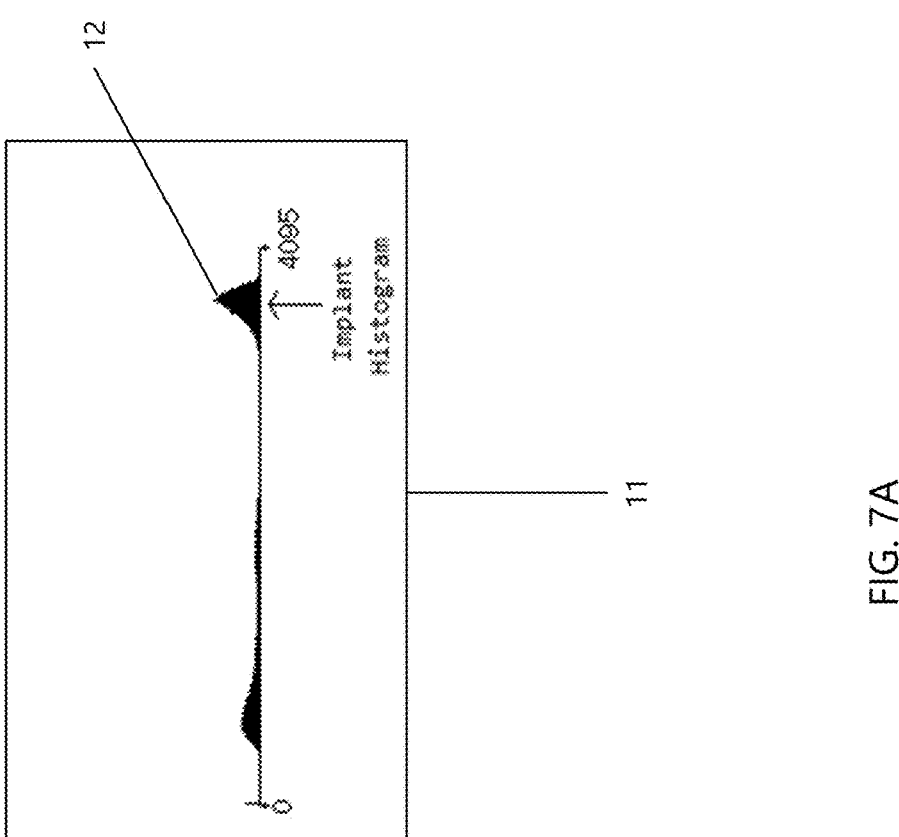

9 histogram 11, as shown in FIG. 7A, of the DICOM image 1J. The image histogram 11 has an image histogram center, or image window center, and an image dynamic range, or image window width, known to one having ordinary skill in the art. The at least one pixel tone value can also include a maximum pixel value and/or a minimum pixel value of the DICOM image 1J.

The tone conversion can include calculating a target pixel tone value based on the at least one pixel tone value and the location of the plurality of pixels. In accordance with the disclosed subject matter, the at least one pixel tone value can include an artificial object histogram 12 by calculating the artificial object histogram of the location of the plurality of pixels corresponding to the artificial object region 401, as shown in FIG. 4C. The artificial object histogram 12 has an object histogram center, or object window center, and an object dynamic range, or object window width. Tone conversion can shift, or adjust, the at least one pixel tone value to a target pixel tone value. In accordance with the disclosed subject matter, the artificial object histogram 12, or the at least one pixel tone value, can be adjusted to the window center of the image histogram 11 to create a tone converted image histogram 13, or target pixel tone value, as shown in FIG. 7B. The tone converted image histogram 13 can have a converted histogram center, or converted window center, and a converted dynamic range, or converted window width. Tone conversion can then apply the tone converted image histogram 12 to the plurality of pixels corresponding to the altered artificial object region 404, as shown in FIG. 6. The at least one pixel tone value, which can include the maximum and/or minimum pixel values, can be used to calculate a target pixel tone value from which a plurality of pixel tone values in the DICOM image 1J can be adjusted to the target pixel tone value.

The tone conversion can be calculated according to the following formulas:

$$slope = \frac{image\ window\ width}{object\ window\ width} * supression\ ratio \quad (5)$$

$$intercept = -slope * object\ window\ center + image\ window\ center \quad (6)$$

$$suppressed\ object\ pixel\ value = slope * object\ pixel\ value + intercept \quad (7)$$

The suppression ratio in the above formulas is a system defined ratio that affects the strength of the tone suppression. The suppression ratio can be determined automatically based on the image. The suppression ratio can be determined by the user of the system. The object pixel value can be the pixel tone values of the plurality of pixels corresponding to the artificial object 401. The suppressed object pixel value can be the pixel tone values of the converted artificial object region 404. The suppressed object pixel values can also correspond with the target pixel values, as discussed previously. Accordingly, the pixel tone values of the converted artificial object region 404 can be altered such that it creates a tone converted DICOM image 1JE, as shown in FIG. 6.

Figure 8:
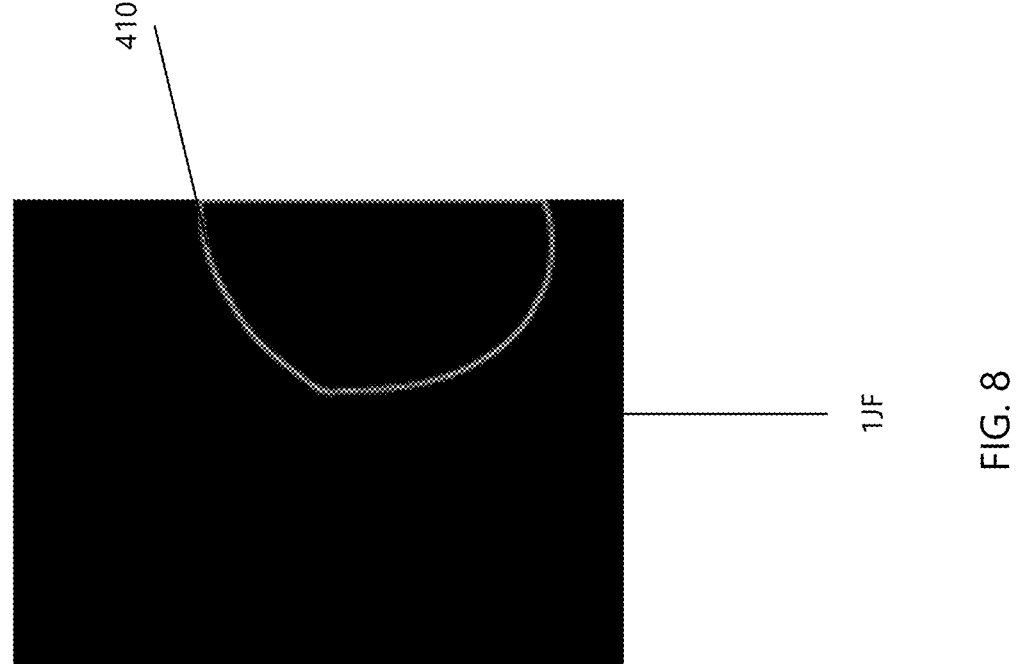
FIG. 8 shows an extracted image identifying the boundary region, in accordance with the disclosed subject matter.

Workstation 60 can detect and alter the boundary region 410, as shown in FIG. 8, of the converted artificial object region 404 in the tone converted DICOM image 1JF. Detection and alteration of the boundary region 410 can also be performed in the altered DICOM image 1JD Boundary region 410 can be located by scanning all of the pixels in the DICOM image 1JF from left to right to find a first bright pixel and assigns the pixel as a boundary pixel. The workstation 60 continues scanning by returning to the left side of

Figure 9:
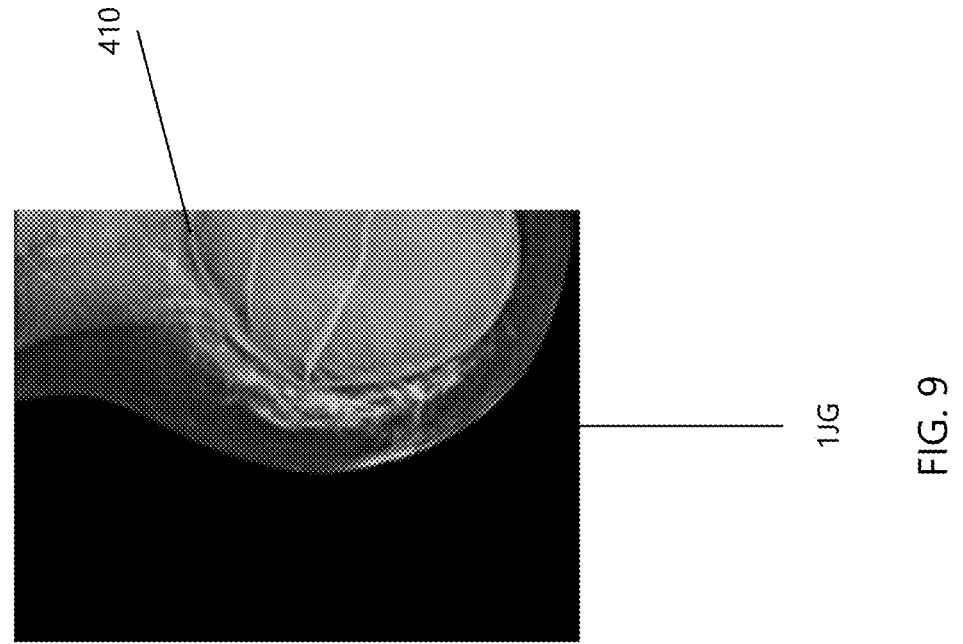
FIG. 9 shows a boundary altered medical image, in accordance with the disclosed subject matter.

10 the image and scanning the next line of pixels until finding a second bright pixel and assigns the pixel as a boundary pixel. This process proceeds through the image 1JD until each line of pixels is scanned. Scanning can be performed in any suitable, organized process (for example from right to left and bottom to top). The workstation 60 then assigns of the pixels assigned as a boundary pixel as the boundary region 410. Using the boundary region 410, workstation 60 can alter the pixel brightness value of the boundary region 410 in the tone converted DICOM image 1JE to a predetermined brightness value to create a boundary altered DICOM image 1JG, as shown in FIG. 9.

Workstation 60 can alter the pixel brightness values, or alter the pixel tone values, using the above described techniques, of 3-D DICOM images. Altering the pixel brightness values, or pixel tone values, of an artificial object in a 3-D DICOM image, such as a Breast Tomosynthesis Image, can be performed by calculating a 3-D artificial object region and altering brightness values, or pixel tone values, of the 3-D artificial object region to create an altered 3-D DICOM image. The 3-D artificial object region can be calculated using a variety of methods. The 3-D artificial object region can be calculated by locating a target artificial object region of the 3-D DICOM image, such as the center of the 3-D DICOM image, and applying the target artificial object region to the 3-D DICOM image.

The 3-D artificial object region can also be calculated using a 2-D synthesis image of the 3-D DICOM image to create a 2-D synthesis artificial object region. The 2-D synthesis artificial object region is calculated in a similar manner as the artificial object region in the altered DICOM image 17D. Using the same techniques, the pixel brightness values of the 3-D DICOM image can be altered to form the altered 3-D DICOM image.

Figures 10A, 10B, 10C:
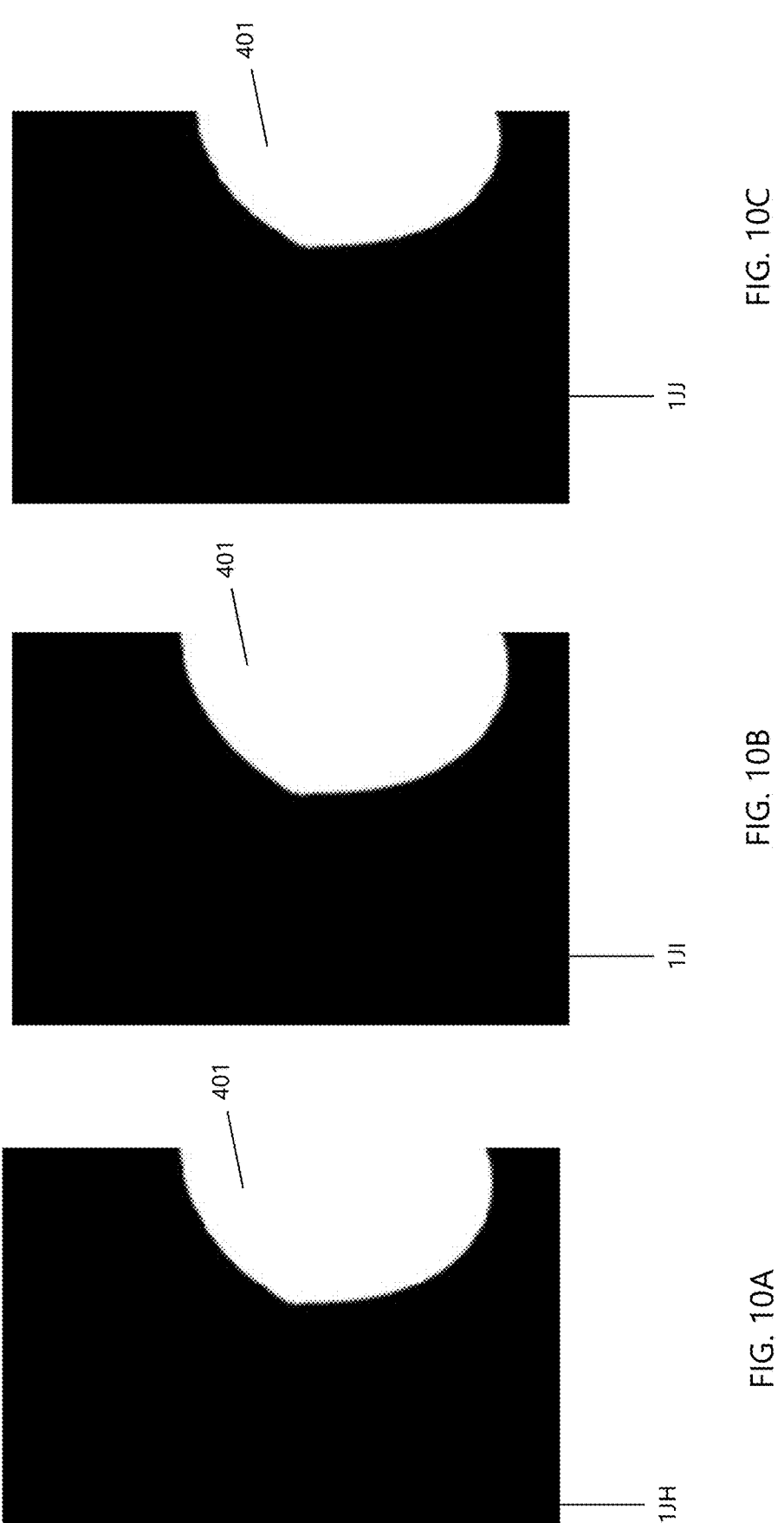
FIG. 10A shows a binarized image that contains an artificial object, in accordance with the disclosed subject matter.
FIG. 10B shows a binarized image that contains an artificial object, in accordance with the disclosed subject matter.
FIG. 10C shows a binarized image that contains an artificial object, in accordance with the disclosed subject matter.
Figure 11:
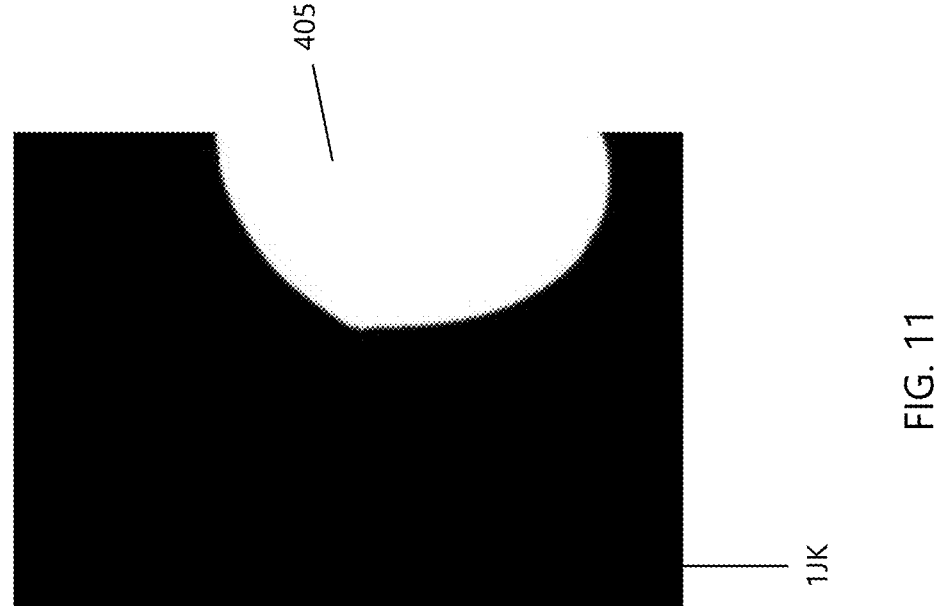
FIG. 11 shows a binarized image that contains an artificial object that combines the artificial objects of FIGS. 10A-10C, in accordance with the disclosed subject matter.

The 3-D artificial object region can also be calculated using multiple frames of the 3-D DICOM image. Multiple artificial object regions can be calculated using the multiple frames of the 3-D DICOM image using the techniques described above. The multiple artificial object regions can then be combined to select a single combined artificial object region which can then be applied to the 3-D DICOM image. The combined artificial object region can be the largest of the multiple artificial object regions calculated using the above techniques. The 3-D DICOM image can contain a plurality of frames. Using the above described binarization and extraction processes with regards to a 2-D DICOM image, the plurality of frames of the 3-D DICOM image can be binarized and extracted to form a plurality of masking frames. The plurality of masking frames can then be combined to form a combined masking image having the combined artificial object region. As shown in FIGS. 10-11, (for simplicity shown with three frames but any number of frames could be used), a first masking frame 1JH in FIG. 10A, a second masking frame 1JI in FIG. 10B, a third masking frame 1JJ in FIG. 10C, and a combined masking image 1JK in FIG. 11. Each of the masking frames 1JH, 1JI, and 1JJ having an artificial object region 401. The masking frame 1JK in FIG. 11 includes a combined artificial object region 405. The combined masking image 1JK can be calculated by taking the binarized pixel value of each of the plurality of masking frames and comparing with the corresponding pixels in the other plurality of masking frames. The binarized pixel values can be combined to form a combined pixel value using the following equation:

$$Combined\ Pixel=Frame_1Pixel|Frame_2Pixel| \ldots |Frame_nPixel \quad (8)$$

The combined pixels can be used to form the combined masking frame 1JK and the combined artificial object region 405. The combined artificial object region 405 can then be applied, using the processes described above with regards to FIGS. 4 and 5, to each frame of the 3-D DICOM image to mask the 3-D artificial object region.

One or more of the DICOM images 1 (E.g., 1J, 1JA-1JG) can be displayed, for example on GUI 65. Providing the adjusted images can be important for a user to accurately read and identify individual pixel values to properly read the image. The human eye can be heavily influenced by the brightness of background pixels and reducing the relative brightness of certain pixels can reduce aid in properly reading images. Further, a large contrast between brighter and darker pixels can lead to strain on the user's eyes. Accordingly, it can be beneficial to adjust the brightness values of individual pixels in the medical images.

Figure 12:
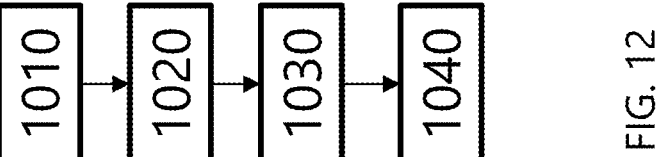
FIG. 12 is a flow chart illustrating how to alter the brightness of pixels in digital images by masking, in accordance with the disclosed subject matter.
Figure 12:
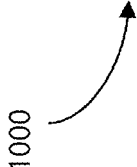

FIG. 12 illustrates an example method 1000 for altering pixel brightness values in a digital image. The method can begin at step 1010, where the method includes receiving, at one or more computing devices, a digital image, with the digital image having a plurality of pixels. At step 1020 the method can include identifying, at the one or more computing devices, a measured brightness value of each of the plurality of pixels. At step 1030 the method can include determining, at the one or more computing devices, a location of the plurality of pixels corresponding to an artificial object in the digital image based on the measured brightness value of each of the plurality of pixels. At step 1040 the method can include adjusting, at the one or more computing devices, the measured brightness value of each of the pixels at the location of the plurality of pixels corresponding to the artificial object in the digital image to a predetermined brightness value to form a new digital image. In accordance with the disclosed subject matter, the method can repeat one or more steps of the method of FIG. 12, where appropriate. Although this disclosure describes and illustrates particular steps of the method of FIG. 12 as occurring in a particular order, this disclosure contemplates any suitable steps of the method of FIG. 10 occurring in any suitable order. Moreover, although this disclosure describes and illustrates an example method for altering pixel brightness values in a digital image including the particular steps of the method of FIG. 12, this disclosure contemplates any suitable method for altering the pixel brightness values in a digital image including any suitable steps, which can include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
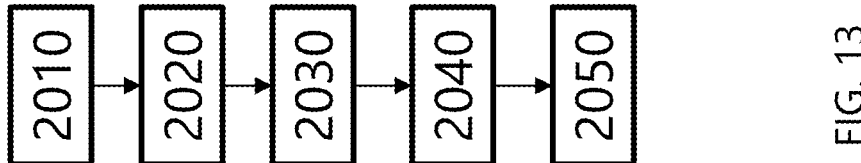
FIG. 13 is a flow chart illustrating how to alter the brightness of pixels in digital images by tone conversion, in accordance with the disclosed subject matter.
Figure 13:
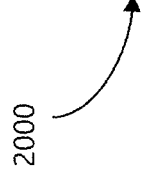
Figure 14:
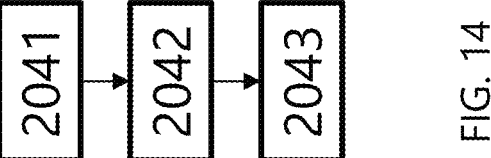
FIG. 14 is a flow chart illustrating how a tone conversion suppresses a tone of the artificial object in the digital image, in accordance with the disclosed subject matter.
Figure 14:
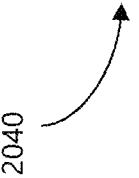

FIG. 13 illustrates an example method 2000 for altering pixel tone values in a digital image. The method can begin at step 2010, where the method includes receiving, at one or more computing devices, a digital image, with the digital image having a plurality of pixels. At step 2020 the method can include identifying, at the one or more computing devices, a measured brightness value of each of the plurality of pixels. At step 2030 the method can include determining, at the one or more computing devices, a location of the plurality of pixels corresponding to an artificial object in the digital image based on the measured brightness value of each of the plurality of pixels. At step 2040 the method can include calculating, at the one or more computing devices, a tone conversion configured to suppress a tone of the artificial object in the digital image. As shown in FIG. 14, step 2040 can include the step 2041 of measuring, at the one or more computing devices, an image histogram of the digital image. As shown in FIG. 14, step 2040 can include step 2042 of analyzing, at the one or more computing devices, the image histogram to determine an artificial object image histogram based on the location of the plurality of pixels corresponding to the artificial object in the digital image. As shown in FIG. 14, step 2040 can include step 2043 of adjusting, at the one more computing devices, the artificial object image histogram to form a target image histogram. Referring to FIG. 13, at step 2050 the method can include applying, at the one or more computing devices, the tone conversion to each of the pixels at the location of the plurality of pixels corresponding to the artificial object in the digital image to form a new digital image. In accordance with the disclosed subject matter, the method can repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for altering pixel tone values in a digital image including the particular steps of the method of FIG. 13, this disclosure contemplates any suitable method for altering pixel tone values in a digital image including any suitable steps, which can include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

The subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or may be included in, one or more separate physical components or media (e.g., multiple CDs, disks, or other storage devices).

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus also can include, in addition to hardware, code that creates an execution environment for the computer program in question, e.g., code that constitutes processor firmware, a protocol stack, a database management system, an operating system, a crossplatform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program can include, by way of example and not by way of limitation, both general and special purpose microprocessors. Devices suitable for storing computer program instructions and data can include all forms of non-volatile memory, media and memory devices, including by way of example but not by way of limitation, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Additionally, as described above in connection with certain embodiments, certain components can communicate with certain other components, for example via a network, e.g., a local area network or the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A method of altering pixel brightness values in a digital image, the method comprising:

receiving, at one or more computing devices, a Breast Tomosynthesis Image including a plurality of 2-D digital images, each 2-D digital image having a plurality of pixels;

for each 2-D digital image:

identifying, at the one or more computing devices, a measured brightness value of each of the plurality of pixels of the 2-D digital image;

determining, at the one or more computing devices, a location of the plurality of pixels corresponding to an artificial object in the 2-D digital image based on the measured brightness value of each of the plurality of pixels, wherein determining a location of the plurality of pixels corresponding to the artificial object in the 2-D digital image based on the brightness value of each of the plurality of pixels comprises:

generating a binarized image by assigning each of the plurality pixels one of:

a first value if the measured brightness value of each of the plurality of pixels is above a threshold value, and a second value if the measured brightness value of each of the plurality of pixels is below the threshold value, labeling the binarized image utilizing connected-component labeling, and identifying a largest object region as the location of the plurality of pixels corresponding to the artificial object by checking a total number of pixels for each label in the binarized image for a first label having a greatest number of pixels and assigning the first label as the largest object region, and adjusting, at the one or more computing devices, the measured brightness value of each of the pixels at the location of the plurality of pixels corresponding to the artificial object in the 2-D digital image to a predetermined brightness value to form a new 2-D digital image; and combining the new 2-D digital images to form a new Breast Tomosynthesis Image;

wherein the predetermined brightness value is less than the measured brightness value.

2. The method of claim 1, wherein the threshold value is decided by the input.

3. The method of claim 1, wherein the location of the plurality of pixels corresponding to the artificial object in the 2D digital image is based on if the plurality of pixels are assigned the first value.

4. The method of claim 1, further comprising displaying, at one or more computing devices, the new Breast Tomosynthesis Image.

5. A system comprising: one or more processors; and non-transitory memory coupled to the processors comprising instructions executable by the processors, the processors being operable when executing the instructions to:

receive a Breast Tomosynthesis Image including a plu-
rality of 2-D digital images, each 2-D digital image
having a plurality of pixels;
for each 2-D digital image:
  identify a measured brightness value of each of the
    plurality of pixels of the 2-D digital image;
  determine a location of the plurality of pixels corre-
    sponding to an artificial object in the 2-D digital
    image based on the measured brightness value of
    each of the plurality of pixels, wherein determining
    a location of the plurality of pixels corresponding to
    the artificial object in the 2-D digital image based on
    the brightness value of each of the plurality of pixels
    comprises:
  generating a binarized image by assigning each of the
    plurality pixels one of:
    a first value if the measured brightness value of each
      of the plurality of pixels is above a threshold
      value, and
    a second value if the measured brightness value of
      each of the plurality of pixels is below the thresh-
      old value,
  labeling the binarized image utilizing connected-com-
    ponent labeling, and identifying a largest object region as the location of the
  plurality of pixels corresponding to the artificial
  object by checking a total number of pixels for each
  label in the binarized image for a first label having a
  greatest number of pixels and assigning the first label
  as the largest object region, and
adjust the measured brightness value of each of the
  pixels at the location of the plurality of pixels
  corresponding to the artificial object in the 2-D
  digital image to a predetermined brightness value to
  form a new 2-D digital image; and
combine the new 2-D digital images to form a new Breast
  Tomosynthesis Image;
wherein the predetermined brightness value is less than
  the measured brightness value.
6. The system of claim 5, wherein the threshold value is
between 75% and 95% of a maximum brightness value of
the digital image.
7. The system of claim 5, wherein the location of the
plurality of pixels corresponding to the artificial object in the
2-D digital image is based on if the plurality of pixels are
assigned the first value.
8. The system of claim 5, further comprising displaying
the new Breast Tomosynthesis Image.

* * * * *